United States Patent [19]
Di Salvo et al.

[11] 3,752,976
[45] Aug. 14, 1973

[54] DEVICE FOR VARYING THE DIRECTIONAL SETTING OF MOTOR VEHICLE HEADLAMPS

[75] Inventors: Salvatore Di Salvo; Mario Collazuol, both of Turin, Italy

[73] Assignee: FIAT Societa per Azioni, Turin, Italy

[22] Filed: July 9, 1971

[21] Appl. No.: 161,006

[30] Foreign Application Priority Data
July 21, 1970 Italy .............................. 53474 B/70

[52] U.S. Cl. ............................. 240/41.6, 240/8.1 R
[51] Int. Cl. ............................................ F21v 19/02
[58] Field of Search ...................... 240/7.1 R, 8.1 R, 240/57, 41.6, 44

[56] References Cited
UNITED STATES PATENTS
2,733,335  1/1956  Falge ................................ 240/44 X
3,434,107  3/1969  Pfund ............................... 240/44 X
2,920,188  1/1960  Clayton et al. ........................ 240/57
3,546,445  12/1970  Marchant .......................... 240/57 X
3,594,569  7/1971  Cranmore ......................... 240/57 X Primary Examiner—Donald O. Woodiel
Assistant Examiner—Daniel M. Yasich
Attorney—Richard C. Sughrue, Robert V. Sloan et al.

[57] ABSTRACT

A device for adjusting the inclination of a vehicle headlamp in a vertical plane between two predetermined directional settings to allow for variations in the longitudinal trim of a vehicle under different load conditions, independently of the normal adjustment of the headlamp directional setting. The adjusting screw which controls the rocking movement of the headlamp unit in a vertical plane engages a U-section elastic member which is snap-engageable by suitable elastic deformation into seats provided in the headlamp support plate selectively in two operative positions corresponding to the two predetermined headlamp settings.

3 Claims, 9 Drawing Figures

PATENTED AUG 14 1973 3,752,976
SHEET 1 OF 4
Fig.1
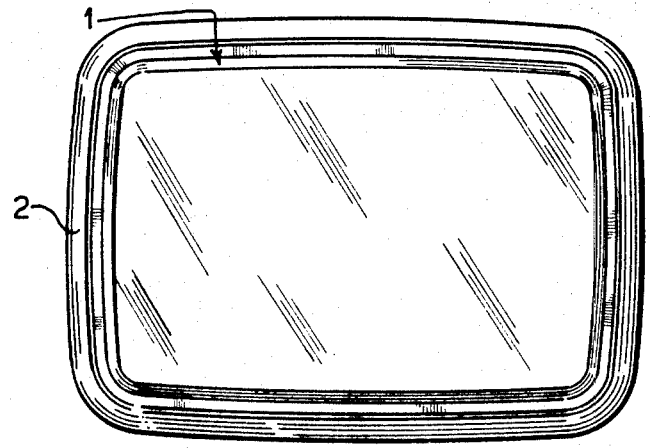
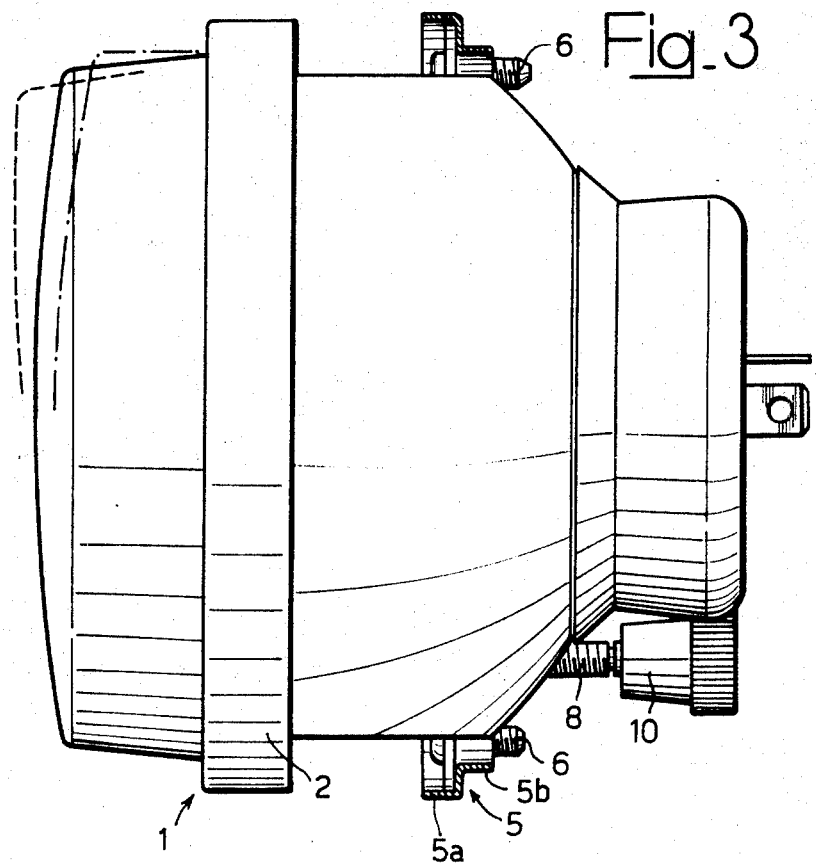
Fig.3
INVENTORS
SALVATORE DI SALVO
MARIO COLLAZUOL
BY Sughrue, Rothwell, Mion, Zinn & Macpeak
ATTORNEYS

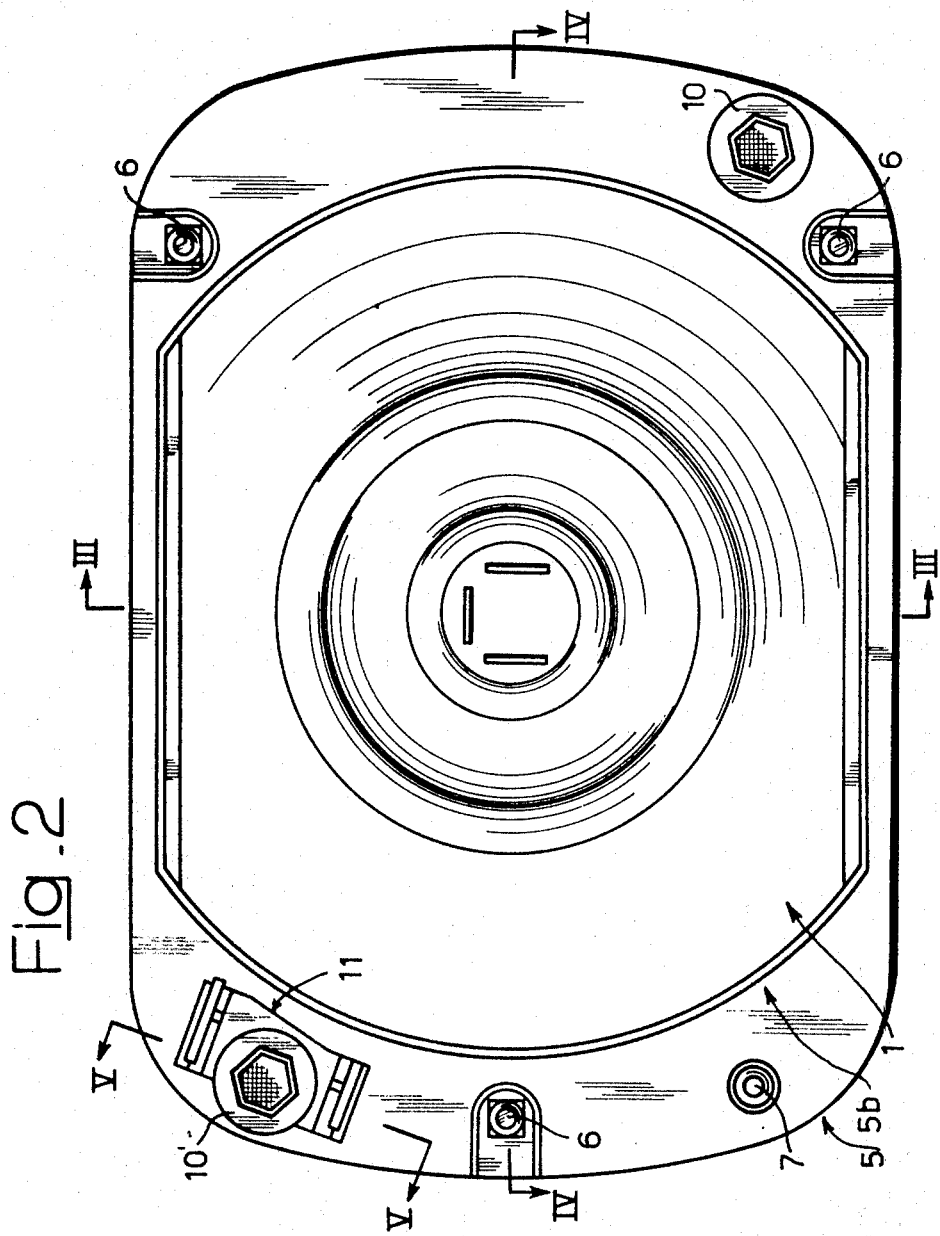

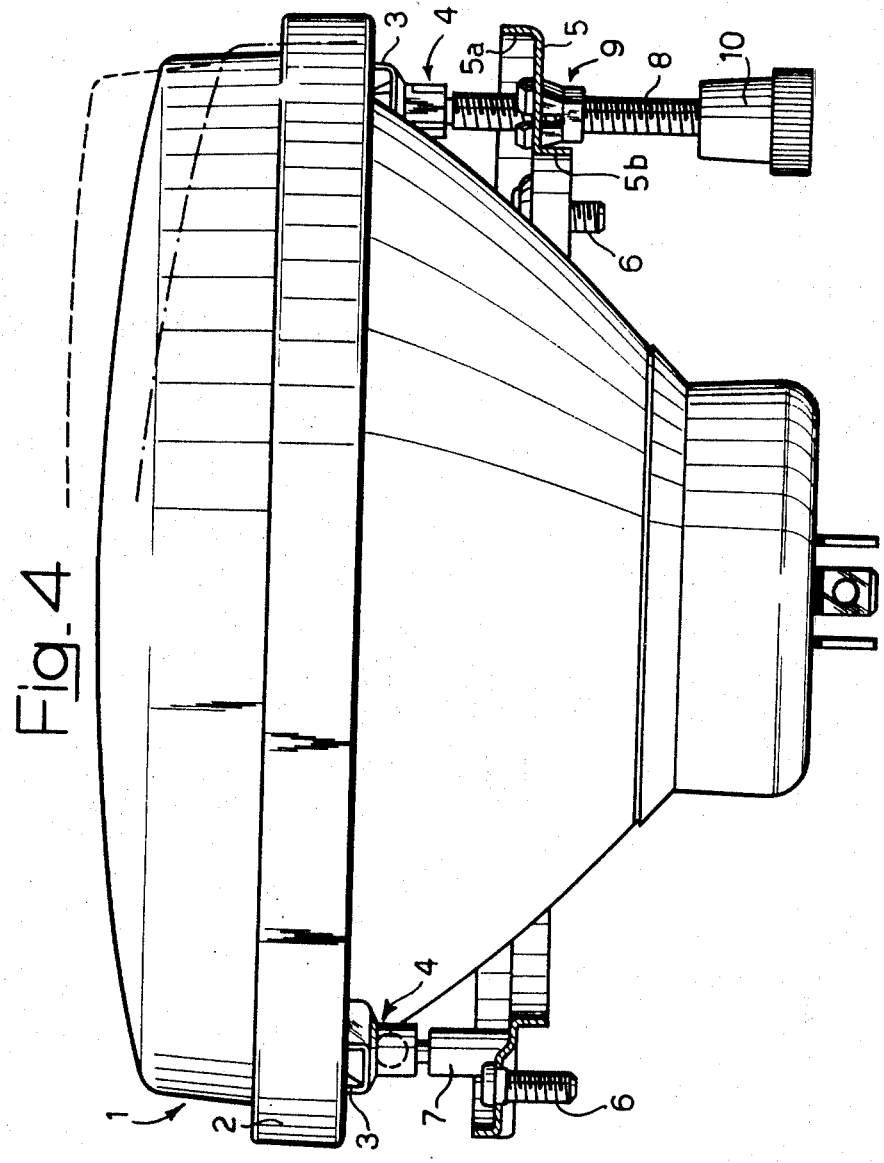

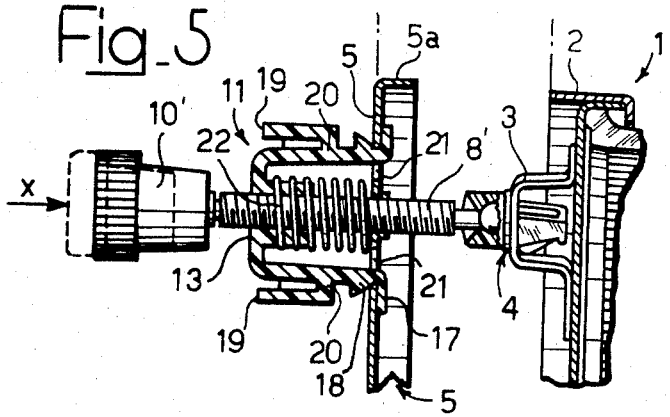
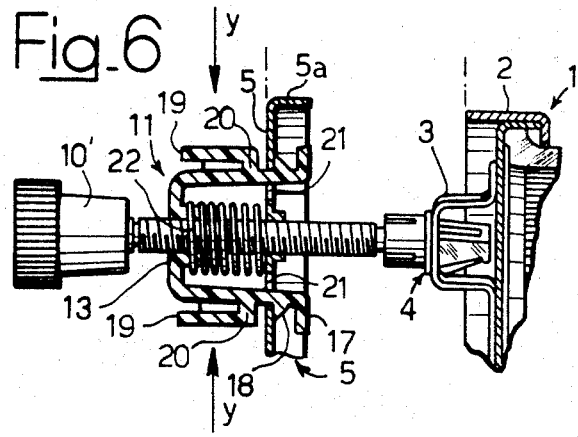
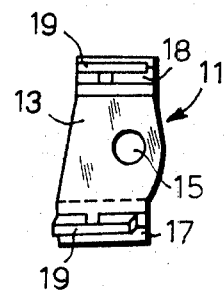
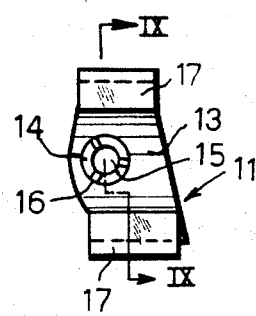
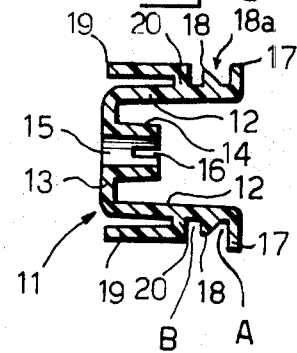

3,752,976

DEVICE FOR VARYING THE DIRECTIONAL SETTING OF MOTOR VEHICLE HEADLAMPS

BACKGROUND OF THE INVENTION

This invention relates to devices for varying the directional setting of headlamps in motor vehicles to allow for variations in trim of the vehicle under different load conditions.

It is known that with every change in the trim of a vehicle, that is, the angle between the longitudinal axis of the vehicle and the horizontal, in response to variations in the load carried, there is a corresponding variation in the angle to the horizontal of the headlamp beams. This variation has an adverse effect both upon the dipped or anti-dazzle beams, the intensity of which may undergo considerable change, and also upon the main driving beams, such as possibly to cause the drivers of oncoming vehicles to be dazzled.

An object of this invention is to counter this adverse effect by providing a device for varying the directional setting of motor vehicle headlamps simply and quickly to provide two predetermined directions of the headlamps for two different load conditions, independently of the normal facility for directional adjustment of the headlamps.

Another object of the invention is to provide a device as aforesaid which is of simple and robust construction and economic to manufacture, as well as being simple and practical to use, giving reliable and accurate setting of a headlamp in said two positions.

More particularly, it is an object of the invention to provide a device for varying the directional setting of a motor vehicle headlamp to compensate for variations in the trim of the vehicle under different loads, the said device comprising two adjusting screws and a fixed pin by means of which a headlamp optical unit is connected to an annular support plate adapted to be fixed to the vehicle coachwork, an elastic U-section member adapted to be engaged in seatings in the said support plate the said member having a portion with which one of the said adjusting screws engages, which screw controls rocking movement of the headlamp unit in a substantially vertical plane, said U-section member further being provided with two adjacent pairs of oppositely disposed seats in which the support plate may engage selectively to locate the said member in two different operative positions relative to the support plate, corresponding to two different inclinations of the headlamp unit to the horizontal, changeover from one to the other of said operative positions being achievable by elastic deformation of the opposite wings of the said U-section member.

BRIEF DESCRIPTION OF THE DRAWINGS

The invention will be more clearly understood from the detailed description which follows, given by way of non-limiting example, with reference to the attached drawings, in which:

FIG. 1 is a diagrammatic front elevational view of a headlamp assembly for motor vehicles provided with a device according to the invention for varying its directional setting according to the load on the vehicle;

FIG. 2 is a rear elevational view of the headlamp assembly;

FIG. 3 is an axial section of the headlamp assembly taken along the line III—III of FIG. 2;

FIG. 4 is another axial section of the headlamp assembly, taken along the line IV—IV of FIG. 2;

FIG. 5 is a transverse cross section, taken along the line V—V of FIG. 2, showing the device according to the invention in one operative position;

FIG. 6 is a transverse cross section, similar to FIG 5, showing the device according to the invention in another operative position;

FIG. 7 is a fragmentary plan view from above of the U-section elastic member of the device according to the invention;

FIG. 8 is a fragmentary plan view of the said member from below; and

FIG. 9 is a longitudinal section of the said member, taken along the line IX—IX of FIG. 8.

DETAILED DESCRIPTION OF THE DRAWINGS

In the drawings the optical unit of a motor vehicle headlamp is indicated generally by 1 and is provided with a metal peripheral frame 2. Attached to the rear of the frame 2 there are three spring metal brackets 3 each of which supports a block 4 moulded in plastics material, and provided internally with a spherical socket which is open towards the rear.

The headlamp unit 1 is carried by an annular support plate 5 formed with outer and inner flanges 5a, 5b facing in opposite directions. The support plate 5 is provided with three captive screws 6 by means of which the plate 5 may be fixed to the coachwork of a vehicle in vertical plane. The headlamp unit 1 is connected to the support plate 5 by means of a fixed pin 7 and two adjusting screws 8, 8'. The two adjusting screws 8, 8', and the fixed pin 7, are provided with spherical heads which snap-engage into the sockets of the respective plastics blocks 4 carried by the headlamp unit 1.

The fixed connecting pin 7 forms a swivel joint for rocking movement of the headlamp and is rivetted to the support plate 5. The adjusting screws 8, 8' are provided with knurled knobs 10, 10' which have hexagonal end sockets to facilitate rotation of the screws. One of the screws, 8, engages a nut 9 formed with spring tongues by means of which it is snap-engaged with the support plate 5. The other screw, 8', engages an elastic member 11 which forms the main part of the device for the adjusting of the directional setting of the headlamp according to the invention.

The first screw 8 is so placed as to cause rocking movement of the headlamp unit 1 in a substantially horizontal plane, while the second screw 8' causes rocking movement in a substantially vertical plane.

As is shown in FIGS. 5 to 9, the elastic member 11 comprises a U-section strip moulded in plastics material and has two oppositely disposed resilient wings 12 (FIG. 9) interconnected by a central portion 13. The central portion 13 is provided on its rear face, between the wings 12, with a tubular appendage 14 having axially extending slots 16 in its wall open at the free end of the appendage 14. The appendage 14 has a through bore 15 with which the thread of the adjusting screw 8' engages.

The two spring wings 12 are provided at their free ends with outwardly projecting lips 17 adjacent which respective outwardly projecting ratchet teeth 18 are provided. The teeth 18 are symmetrical with respect to each other, each having a cross-sectional profile in the shape of a right-angled triangle with an inclined face 18a facing towards the respective lip 17. The two wings 12 are further provided with external appendages 19, connected to the said wings 12 by means of integral heel portions 20, adapted to facilitate hand gripping of the member 11.

On assembly the wings 12 of the member 11 are engaged in two slots or apertures 21 made in the headlamp support plate 5, while the adjusting screw 8' passes through the bore 15 of the tubular appendage 14 and through a hole or aperture in the said support plate 5 to engage in the socket of the respective block 4 attached to the headlamp unit 1. Between the plate 5 and the central portion 13 of the U-section member 11 there is located a helical spring 22 which surrounds the screw 8' and the tubular appendage 14 of the portion 13.

The outwardly projecting lips 17 of the two wings 12 form with the respective teeth 18 a first pair of oppositely disposed seats A in which the headlamp support plate 5 can engage in a first operative position of the headlamp; similarly the teeth 18 form, with the heel portions 20 of the appendage 19, a second pair of seats B in which the headlamp support 5 can alternatively engage in a second operative position of the headlamp. Changeover from one operative position to the other is effected by elastic deformation of the U-section member 11 to cause the support plate 5 to engage selectively in the seats A or B, corresponding to two prearranged headlamp beam directions.

As illustrated in FIG. 5, in the first operative position the support plate 5 is engaged in the seats A defined between the lips 17 and the teeth 18. In order to change over to the second operative position, illustrated in FIG. 6, it suffices to exert axial pressure upon the knob 10' of the screw 8' in the direction indicated by the arrow X in FIG. 5; the edges of the support plate 5 ride over the inclined faces of the two teeth 18, deforming the wings 12 of the U-section member 11, until the plate 5 engages in the seats B between the teeth 18 and the heel portions 20. As a result of this displacement of the screw 8' the headlamp unit 1 is moved forwards in the region of the respective bracket 3, and the headlamp beam is tilted downwards.

In order to return to the first operative position from the second operative position it is necessary to distort the two wings 12 elastically by squeezing the two outer appendages 19 between two fingers in the direction of the arrows Y (FIG. 6) until the teeth 18 are disengaged from the edges of the support plate 5, after which the spring 22 returns the member 11 to its first position as shown in FIG. 5.

In each of the two aforesaid operative positions the screw 8' can be rotated in either direction to effect adjustment of the headlamp beam direction independently of that which can be obtained by displacement of the member 11 axially between said two operative positions: the two operative positions of the member 11 correspond respectively to the trim of the vehicle under two extreme conditions, namely when only the driver occupies the vehicle and when the vehicle is fully loaded.

It will be appreciated that various embodiments of the invention are practicable without departing from the scope of the invention.

I claim:

1. A motor vehicle headlamp assembly comprising a headlamp optical unit, an annular support plate surrounding said optical unit and connecting means for adjustably connecting said optical unit to said support plate, said connecting means including swivel means between said unit and said plate, aperture means in said support plate, at least one adjusting screw rotatably secured to said optical unit and an elastic U-shaped member having a central portion with a bore therethrough and two wings extending through said aperture means in operative engagement with said plate, said wings having two adjacent pairs of operatively disposed seats for selective engagement with said support plate to locate said elastic member in two different operative positions relative to said support plate, said screw being disposed in threaded engagement with said bore and extending through said aperture means to adjust the position of said unit relative to said elastic member and said support plate, and said elastic member being deformable to permit change over from one operative position to the other operative position to obtain two different inclinations of said unit relative to said support plate.

2. A motor vehicle headlamp assembly as set forth in claim 1 wherein said elastic U-shaped member is comprised of a plastics material with two wings having respective outer appendages connected to said central portion by means of transverse heel portions, two outwardly projecting lips at the free ends of said wings and two outwardly projecting opposed teeth on said wings, each tooth having an inclined surface facing toward the respective lip and the respective teeth defining with said lips and with said heel portions said two adjacent pairs of oppositely disposed seats in which said headlamp support plate engages selectively in said two operative positions.

3. A motor vehicle headlamp assembly as set forth in claim 1 further comprising a helical spring surrounding a portion of said adjusting screw intermediate said support plate and the central portion of said elastic member.

* * * * *